US012769329B2

(12) United States Patent
Redenius et al.

(10) Patent No.: US 12,769,329 B2
(45) Date of Patent: Oct. 20, 2026

(54) ASSISTANCE SYSTEM FOR GENERATING DRIVING ROUTES

(71) Applicant: CLAAS E-Systems GmbH, Dissen a.T.W. (DE)

(72) Inventors: Jannik Redenius, Oldendorf (DE); Christian Speer, Aach (DE); Jan Behmenburg, Fröndenberg (DE); Timo Korthals, Leopoldshöhe (DE); Sven Bone, Georgsmarienhütte (DE); Josef Fischer, Biberach (DE); Martin Jan Joseph Verploegen, Düsseldorf (DE)

(73) Assignee: CLAAS E-Systems GmbH, Dissen a.T.W. (DE)

( * ) Notice: Subject to any disclaimer, the term of this patent is extended or adjusted under 35 U.S.C. 154(b) by 109 days.

(21) Appl. No.: 18/891,004

(22) Filed: Sep. 20, 2024

(65) Prior Publication Data

US 2025/0089609 A1 Mar. 20, 2025

(30) Foreign Application Priority Data

Sep. 20, 2023 (DE) ......................... 102023125513.4

(51) Int. Cl.

*G05D 1/633* (2024.01)
*A01B 69/04* (2006.01)

(Continued)

(52) U.S. Cl.

CPC ........... *G05D 1/633* (2024.01); *A01B 69/008* (2013.01); *A01D 41/02* (2013.01); *G05D 1/2246* (2024.01); *G05D 1/246* (2024.01); *G05D 1/617* (2024.01); *G05D 1/646* (2024.01); *G05D 2105/15* (2024.01); *G05D 2107/21* (2024.01)

(58) Field of Classification Search

CPC ...... G05D 1/633; G05D 1/2246; G05D 1/246; G05D 1/617; G05D 1/646; G05D 2105/15; G05D 2107/21; A01B 69/008; A01D 41/02

See application file for complete search history.

(56) References Cited

U.S. PATENT DOCUMENTS 6,244,024 B1 6/2001 Diekhans
9,706,697 B2 7/2017 Wilkening et al.

(Continued)

FOREIGN PATENT DOCUMENTS

DE 102004027242 A1 12/2005
EP 3414982 B1 7/2020

(Continued)

OTHER PUBLICATIONS

International Search Report for International Application No. 24190284.0-1105 mailed on Jan. 20, 2025.

*Primary Examiner* — Dale W Hilgendorf
(74) *Attorney, Agent, or Firm* — Lempia Summerfield Katz LLC

(57) ABSTRACT

An assistance system for generating driving routes for one or more driver-controlled or autonomous agricultural work machines. The assistance system includes a computer configured to create a driving route for an agricultural work machine configured to work an agricultural area on the basis of a saved strategy, which may take into account features of areas adjacent to the agricultural area which are not to be worked.

20 Claims, 3 Drawing Sheets

(51) Int. Cl.

| | |
|---|---|
| ***A01D 41/02*** | (2006.01) |
| ***G05D 1/224*** | (2024.01) |
| ***G05D 1/246*** | (2024.01) |
| ***G05D 1/617*** | (2024.01) |
| ***G05D 1/646*** | (2024.01) |
| ***G05D 105/15*** | (2024.01) |
| ***G05D 107/20*** | (2024.01) |

(56) References Cited

U.S. PATENT DOCUMENTS

| | | | | |
|---|---|---|---|---|
| 10,663,979 | B2 * | 5/2020 | Grundey | G05D 1/0278 |
| 12,108,736 | B2 * | 10/2024 | Brink | A01B 69/008 |
| 12,153,451 | B1 * | 11/2024 | Perritt, Jr. | G05D 1/695 |
| 2005/0273253 | A1 * | 12/2005 | Diekhans | G01C 21/20 701/50 |
| 2016/0295833 | A1 * | 10/2016 | Baize | A01K 15/029 |
| 2018/0049407 | A1 * | 2/2018 | Castelli | A01K 1/0029 |
| 2018/0084708 | A1 * | 3/2018 | Neitemeier | A01B 69/001 |
| 2018/0329620 | A1 | 11/2018 | Cabrespine | |
| 2020/0031465 | A1 * | 1/2020 | Chung | A01K 29/005 |
| 2020/0097023 | A1 * | 3/2020 | Grundey | A01K 29/00 |
| 2020/0154694 | A1 * | 5/2020 | Santana | A01K 15/023 |
| 2020/0187409 | A1 | 6/2020 | Meyer Zu Helligen | |
| 2021/0163005 | A1 | 6/2021 | Ehlert | |
| 2022/0066456 | A1 * | 3/2022 | Ebrahimi Afrouzi | G06F 3/04883 |
| 2023/0263135 | A1 * | 8/2023 | Azran | A01K 1/0029 701/3 |
| 2023/0345856 | A1 | 11/2023 | Mähler | |
| 2023/0350407 | A1 | 11/2023 | Mähler | |
| 2023/0350409 | A1 * | 11/2023 | Mähler | A01B 69/008 |
| 2023/0350423 | A1 * | 11/2023 | Mähler | A01B 69/008 |
| 2023/0350426 | A1 | 11/2023 | Mähler | |
| 2024/0341289 | A1 * | 10/2024 | Niewohner | G05D 1/2424 |
| 2024/0383472 | A1 * | 11/2024 | McKnew | B60Q 5/006 |
| 2025/0021720 | A1 * | 1/2025 | Gebler | A01M 7/0089 |
| 2025/0029196 | A1 * | 1/2025 | Venkata | G06Q 50/265 |

FOREIGN PATENT DOCUMENTS

| | | | |
|---|---|---|---|
| EP | 4151062 | A1 | 3/2023 |
| WO | 2023094484 | A1 | 6/2023 |

* cited by examiner

ASSISTANCE SYSTEM FOR GENERATING DRIVING ROUTES

CROSS REFERENCE TO RELATED APPLICATION

This application claims priority under 35 U.S.C. § 119 to German Patent Application No. DE 10 2023 125 513.4 filed Sep. 20, 2023, the entire disclosure of which is hereby incorporated by reference herein.

TECHNICAL FIELD

The present invention relates to an assistance system for generating driving routes for one or more agricultural work machines on an agricultural area to be worked, such as a meadow to be mowed or a field to be harvested.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Today's route planning for the working agricultural area by autonomous or highly automated machines is always aimed at the most efficient (i.e. shortest route possible). Wild animals that are in the crop to be worked react differently to the use of machinery depending on their species and age. However, even if a wild animal tries to avoid the working machine, there is a high probability that it will remain in the area being worked if it is forced to leave the cover of the crop to escape. There is therefore an increasing risk that such an animal will be injured or killed because of contact with the agricultural work machine as it is working the field.

EP 3 414 982 B1 describes a method for controlling an agricultural work machine in which an aerial drone flies ahead of the agricultural work machine to monitor for the presence of animals in a lane to be traveled by the agricultural work machine, and a collision avoidance measure is initiated upon detecting an animal.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

Figure 1:
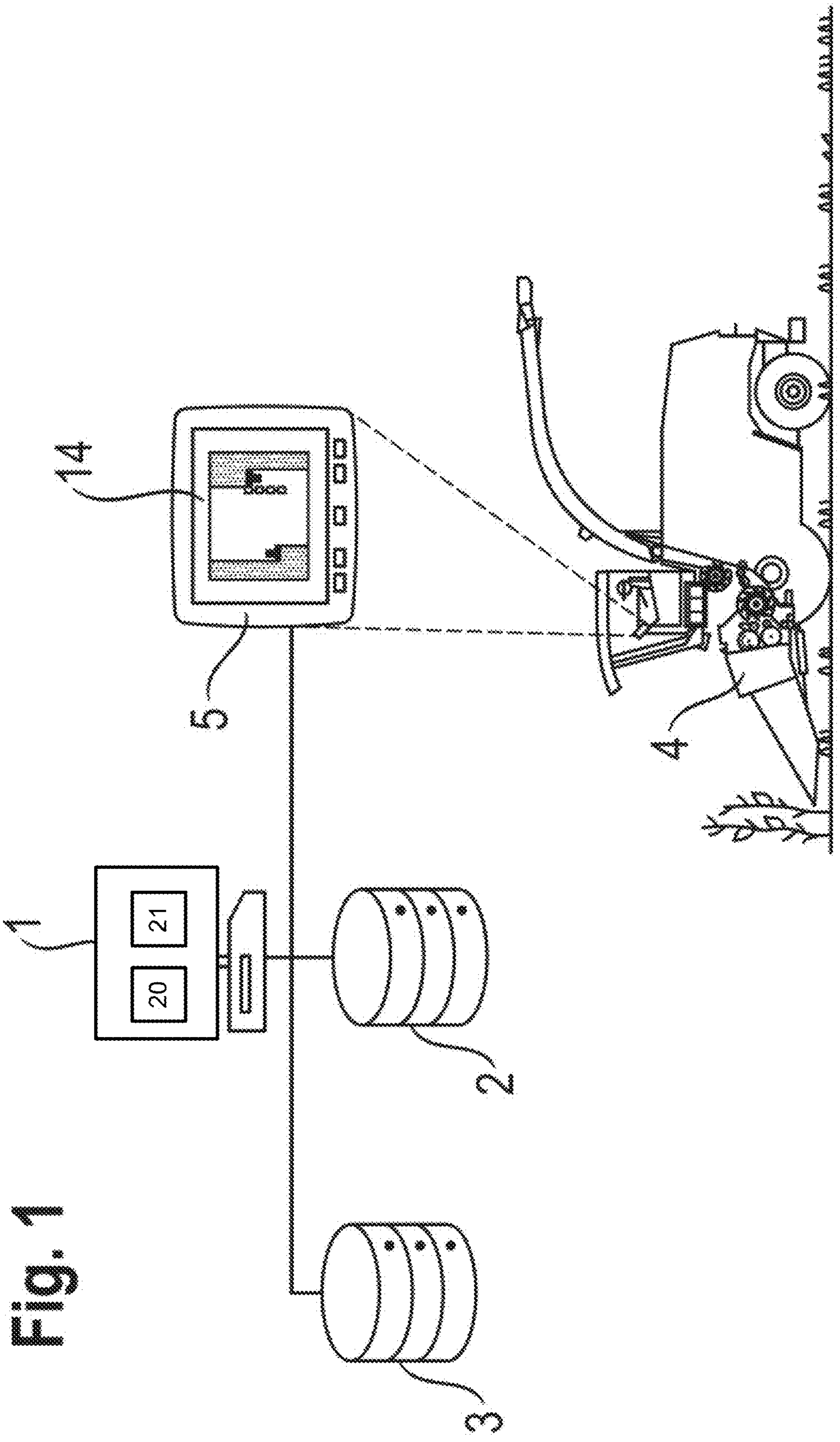
FIG. 1 illustrates a block diagram of the assistance system.

As discussed in the background, EP 3 414 982 B1 describes a method for controlling an agricultural work machine in which an aerial drone flies ahead of the agricultural work machine to monitor for the presence of animals in a lane to be traveled by the agricultural work machine, and for collision avoidance upon detecting an animal. Although this technology may help to protect young animals that try to escape danger by crouching on the ground or to protect ground-nesting birds, it is only marginally effective in the case of animals that try to avoid danger and counteract a collision avoidance measure with unforeseen movements of their own. In particular, such a system may only slightly prevent animals that are trying to escape but cannot find a suitable place to escape from coming into contact with the agricultural work machine.

In one or some embodiments, an assistance system for one or more agricultural work machines is disclosed. The assistance system may also reduce or minimize the risk of contact with animals, possibly evading danger through the use of the agricultural work machines.

In particular, in one or some embodiments, the assistance system may be configured to generate driving routes for one or more autonomous agricultural work machines, in which a computer is configured to create a driving route for one, some, or each of the one or more agricultural work machines configured to work one or more agricultural areas on the basis of a saved strategy, which may take into account direct environmental data of the agricultural area.

In one or some embodiments, the direct environmental data may relate to parcels adjacent to the agricultural area.

Further, in one or some embodiments, the features taken into account may be representative of the suitability of adjacent parcels to serve as an escape destination for an animal on the agricultural area. Since the willingness of an animal to flee in a certain direction may depend on the suitability of a parcel located in this direction as a destination for its escape, the behavior of the animal may be predicted with a certain probability and included in the route planning.

In one or some embodiments, the parcels examined by the assistance system may each be homogeneous in terms of one feature taken into account. For example, one parcel may be a forest, another may be a meadow, still another may be a field with a first crop, and yet another may be a field with a second crop. Since the parcels may differ in one or more aspects, such as any one, any combination, or all of height, density or attractiveness as forage, they each may represent differently attractive escape destinations.

The parcels may not be passable by the agricultural work machine at least while working. In particular, a wooded area may be permanently impassable; an agricultural area whose harvesting time has not yet arrived or that has been harvested previously may be considered temporarily impassable.

In one or some embodiments, the computer may be configured to query the direct environmental data, such as the feature(s) of the parcels adjacent to the agricultural area, from a user and/or from a database. In one or some embodiments, the database may be a publicly accessible cartographic database that provides information on the type of land use. Alternatively, or in addition, more detailed information on the usable areas of an individual farm, such as the crop on a parcel adjacent to the area to be worked and its degree of development, may be available in an internal farm database. The query by the user may enable the consideration of features that are variable and not available in the database, such as whether or not a neighboring parcel has already been harvested.

While information on the geographical position and the outline of an area adjacent to the parcel to be worked may be easily determined in a database that lists the parcel, it may often be difficult for a user to provide corresponding information. For this reason, a user interface (e.g., a touchscreen)

may be configured to accept an input of an expected direction of escape to the parcel from a user instead of this information, provided that the parcel is to be considered as an escape destination.

In order to take into account different animal behavior depending on the species and stage of development, the computer may be configured to select the strategy to be used for generating the driving route from a plurality of saved strategies based on the season of the year and/or an animal species to be protected. Another criterion for selecting a strategy may be the size of the area to be worked. Thus, in one or some embodiments, at least one parcel may be selected that is suitable to guide the animals to, thereby serving as an escape destination for animals from the agricultural area, with the at least one parcel being selected based on presence of vegetation on the at least one parcel and/or type of vegetation on the at least one parcel.

In particular, one strategy may provide for a part of the agricultural area that is adjacent to a parcel suitable as a cover or a way of escape and will be subsequently worked as a part of the agricultural area that is further away from this parcel. In this way, animals that are present in the area may be continuously pushed or guided towards the parcel suitable as a cover or as a way of escape while working, and may easily seek refuge there if the agricultural work machine gets too close to them.

On large areas or if the animals are to be pushed or guided to a specific parcel suitable as a cover or way of escape, the strategy may provide for a central part of the agricultural area that is adjacent to the parcel suitable as a cover or way of escape to be worked later than the peripheral parts of the agricultural area flanking the central part. In this way, animals may initially be forced or guided into the central part when working the peripheral parts; from there, if the central area is to be worked later, the animals may still have the way to escape to the parcel adjacent to the central area, but not to parcels that may only be reached via the peripheral parts that have already been worked and that no longer provide cover.

To reduce or minimize the distance that an animal has to flee to get to safety from the agricultural work machine, a strategy may also provide for a central part of the agricultural area to be worked earlier than two parts adjacent to the central part on either side.

To push an animal towards a suitable refuge on the one hand and to give it enough time to evade on the other, a saved strategy may provide for a driving route to run mostly parallel to an edge of the agricultural area adjacent to a parcel suitable as a cover or way of escape.

In particular, in the case of a non-autonomous or at least non-autonomously operated machine, the user interface may be configured to display the driving route created by the computer to a user. The user may also usefully be offered the option of editing the displayed driving route; in this way, boundary conditions for which the computer had no data may also be taken into account.

In one or some embodiments, an agricultural machine with a drivable base unit and a corn picker is disclosed, in which the drive shaft of the at least one transmission unit is coupled to an output connection, for example a power take-off shaft, of the base unit.

Referring to the figures, FIG. 1 shows an assistance system with a computer 1 and databases 2, 3 with which the computer communicates. Computer 1 may include at least one processor 20 and at least one memory 21. The at least one processor 20 and at least one memory 21 may be in communication (e.g., wired and/or wirelessly) with one another. In one or some embodiments, the processor 20 may comprise a microprocessor, controller, PLA (Programmable Logic Array), or the like. Similarly, the memory 21 may comprise any type of storage device (e.g., any type of memory). Though the processor 20 and the memory 21 are depicted as separate elements, they may be part of a single machine, which includes a microprocessor (or other type of controller) and a memory. Alternatively, the processor 20 may rely on the memory 21 for all of its memory needs. Still alternatively, or in addition, the processor 20 may rely on databases 2, 3 for its memory needs. The memory 21 may comprise a tangible computer-readable medium that include software that, when executed by the processor 20 is configured to perform any one, any combination, or all of the functionality described herein, such as the functionality of the assistance system.

The processor 20 and the memory 21 are merely one example of a computational configuration for the computer 1. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Various configurations of the computer 1 are contemplated. As one example, the computer 1 may be centralized, such as in the form of a stationary computer of a farm. As another example, computer 1 may be implemented as a network of several computers, such as including on-board computers 5 of agricultural work machines 4 of the farm. As still another example, computer 1 may be localized on such an on-board computer alone.

In one or some embodiments, the database 2 may comprise a reference database that saves agronomic data, such as data on any one, any combination, or all of soil conditions; crop; yield; geographical data on the agricultural areas of the farm; or information on animals observed on the areas in the past. The geographical data may define the coordinates of the boundaries of each area and/or possible entry points at which a machine may enter and/or leave the area.

In one or some embodiments, the database 3 comprises a public database, such as accessible via the Internet, in which geographical data may be queried over the entire area, such as also for parcels which are not listed in reference database 2 (e.g., because the parcel(s) do not belong to the farm).

If an agricultural area 6 of the farm is to be worked, the computer 1 may plan one or more driving routes for one or more agricultural work machines involved in the work on the basis of information available in the databases 2, 3 on the agricultural area 6 and adjacent parcel 7, 9 and road 8.

For this purpose, a plurality of planning strategies may be saved in a program library of computer 1. Various strategies are contemplated, including at least one purely efficiency-oriented strategy and/or animal welfare-oriented strategies that are designed to take into account ways of escape for animals that may be in the area when planning a route. These strategies may be species or animal group-specific, for example to take account of the different escape behavior of birds, cloven-hoofed game or wild boar; the strategies may also be season-specific to take account of behavioral differences in the mating season, at the time of rearing young, etc. Of these strategies, computer 1 may initially automatically select the respective strategy that may correspond to the one or more aspects, such as current season and/or the animals that are likely to be present in the area (e.g., based on previous sightings). In this regard, in one or some embodiments, computer 1 may receive as input the one or more aspects in order to automatically select the respective strategy. Alternatively, or in addition, computer 1 may automatically determine the one or more aspects in order to automatically select the respective strategy.

Figure 2A:
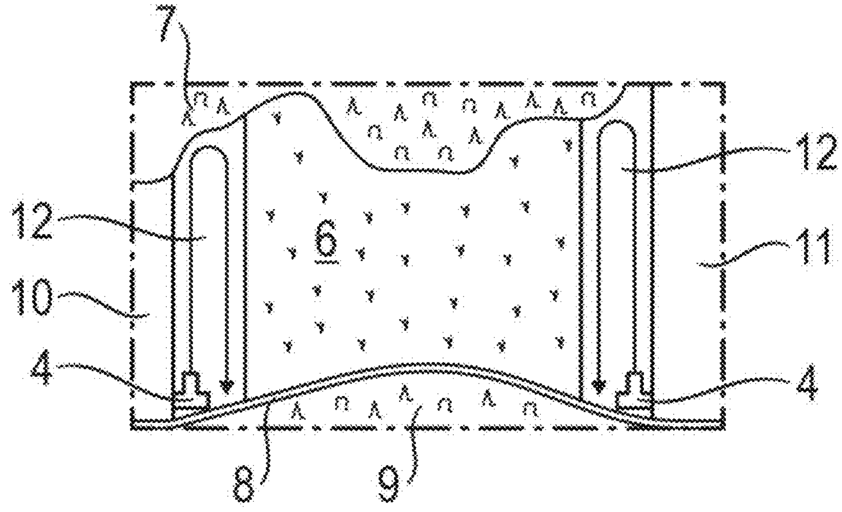
FIGS. 2*a-b* illustrate a first exemplary situation of use of the assistance system.

In a map, FIG. 2*a* shows the agricultural area 6 and adjacent parcels. One of the adjacent parcels 7 is a wooded area, opposite which is a road 8 and behind it another wooded parcel 9. Other adjacent parcels are, for example, fields 10, 11.

Responsive to selecting the purely efficiency-oriented strategy, one result of the route planning by the computer 1 may be, for example, that a route for one of the agricultural work machines 4 initially runs along all the boundaries of the agricultural area 6 in order to create turning space around a still unworked core region of the agricultural area 6, and that the route then runs back and forth on the core area to work it strip by strip. Since the initial processing along the boundaries eliminates the option for animals on agricultural area 6 to escape unseen, there is a high probability that the animals will be crowded together in the unworked remainder of the area while working and will ultimately no longer be able to avoid contact with the agricultural work machine.

In an animal welfare-oriented strategy, computer 1 may first use information from databases 2, 3 to determine which types of parcels are available around the agricultural area 6 to be worked and their suitability as a refuge for animals. Wooded parcel 7 may be well-suited, fields 10, 11 may be less so, firstly because fields 10, 11 may not provide sufficient cover, especially for larger animals and because the animals may cause damage there. Although wooded parcel 9 would be suitable in itself, it is unlikely that the animals will readily move there due to the lack of cover on road 8. The route determined by the strategy therefore may envisage, as shown in FIG. 2*a*, initially working the agricultural area 6 only along its borders to the neighboring fields 10, 11 and thus creating open edge strips 12. The disturbance associated therewith may give the animals reason to leave the agricultural area 6; at the same time, escape to fields 10, 11 may be made unattractive, so that a migration primarily to the wooded parcel 7 is to be expected. Thus, in one or some embodiments, computer 1 may consider a plurality of parcels around the agricultural area 6 in order to determine: (i) which subset of parcel(s) of the plurality of parcels are suitable to guide the animal(s) toward; and (ii) the route to guide the animal(s) toward the subset of parcel(s).

Figure 2B:
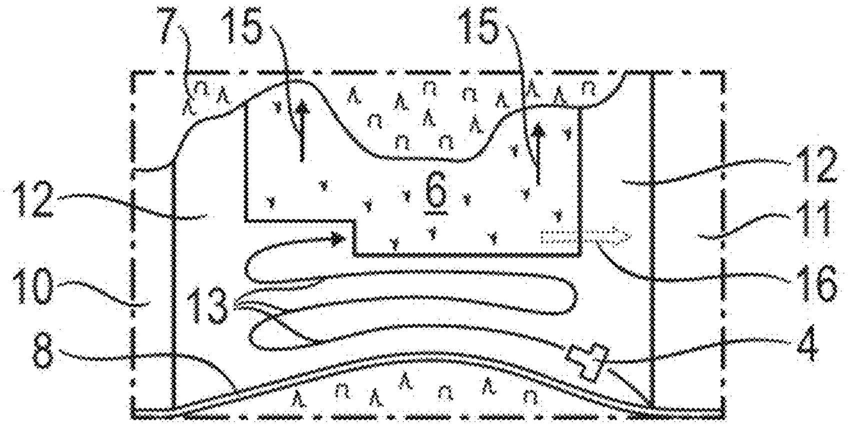

In a second, possibly time-delayed phase of work, the route may provide for the agricultural work machine 4 to advance toward the agricultural area 6 from the side of the road 8 by working tracks 13 approximately parallel to the edge of the wooded parcel 7, as shown in FIG. 2*b*, and turning between two tracks 13 on one of the edge strips 12. As a result of the disturbance always coming from the same side but advancing slowly, those animals in the still unworked part of agricultural area 6 that have not already been driven away by working the edge strips 12 may be slowly pushed or guided towards wooded parcel 7.

If the agricultural work machine 4 is autonomous, the route planned by the computer 1 may be traveled by machine on the agricultural area 6 without further intervention by a driver. For example, in one or some embodiments, the agricultural work machine 4 may be operated autonomously, under the automatic control of computer 1, in one or more operations of the agricultural work machine 4, such as one or both of: the automatic movement of the agricultural work machine 4 (e.g., any one, any combination, or all of: driving; steering; or stopping); the automatic operation of one or more work assemblies. Examples of autonomous agricultural work machines 4 are disclosed in: U.S. Pat. Nos. 6,244,024; 9,706,697; US Patent Application Publication No. 2018/0084708 A1; US Patent Application Publication No. 20180329620 A1; US Patent Application Publication No. 2020/0187409 A1; US Patent Application Publication No. 2021/0163005 A1; US Patent Application Publication No. 2023/0350426 A1; US Patent Application Publication No. 2023/0350407 A1; US Patent Application Publication No. 2023/0350423 A1; US Patent Application Publication No. 2023/0350409 A1; or US Patent Application Publication No. 2023/0345856 A1, each of which is incorporated by reference herein in their entirety.

In the case where the agricultural work machine 4 has a driver, in one or some embodiments, responsive to the computer 1 automatically determining the planned route, the computer 1 may automatically show the planned route to the driver on a display 14 (e.g., a touchscreen) of its on-board computer 5 in a representation corresponding to FIGS. 2*a-b* and 3*a-b*. The driver may then approve (e.g., via display 14) the suggested route and have the agricultural work machine 4 drive the route autonomously, or the driver may drive it himself manually. In addition, the driver may have the option of rejecting the suggested route if the driver considers the suggested route inappropriate. The need for this may arise if the data on the adjacent parcels 7-11 that was available to computer 1 was incomplete or out of date, for example because the wooded area 7 has been cut down in the meantime, or a fence is blocking an assumed way of escape. In this case, the driver may specify an alternative way of escape on the map shown to him on the display 14, for example by deleting arrows 15 representative of the escape direction used by the computer 1 (e.g., an automated expected escape direction generated by computer 1) and replacing them with arrows 16 in the direction of an way of escape that the driver judges to be more suitable, here for example in the direction of the neighboring field 11, and the computer 1 may create a new route plan for agricultural area 6 using the same strategy as before, but based on an assessment of the suitability of the adjacent parcels as a refuge for the animals that has been changed based on input from the driver.

In this regard, in one or some embodiments, the computer 1, in generating the output for presentation on display 14, may present the planned route to the driver (e.g., the planned route superimposed on a map view or the planned route integrated with an image of the agricultural area 6 and/or adjacent area(s)) along with an indication (e.g., icon, indicia, or the like) of the escape direction (as planned by computer 1) for the animal(s). As discussed above, the indication of the escape direction may comprise an arrow 15. Other indications of the escape direction are contemplated. Regardless, the indication of the escape direction may inform the driver as to the planned escape direction of the animals as contemplated by the computer 1. Further, in one or some embodiments, displaying the combination of the planned route and the indication (e.g., the arrow 15) may inform the driver as to the plan for guiding the animals to a safe area (e.g., guided towards the parcel suitable as a cover or as a way of escape). This is illustrated, for example, in FIG. 2*b*, in which track 13 is shown as snaking from right-to-left and back, effectively pushing the animals upward (as shown by arrow 15). Again, the combination of illustrating the track 13 and the arrow 15 may inform the driver as to the plan to guide the animals to the safe area.

Further, in one or some embodiments, computer 1 may be configured to receive input as to the driver's input of the escape route for the animals. For example, the driver may provide input (e.g., via a touchscreen) as to the escape route for the animals using arrow 16. In one or some embodiments, the driver's input may be responsive to the automatic output by computer 1 of the planned route and the indication (e.g., arrow 15). In the example in FIG. 2*b*, the driver may provide arrow 16 as contrast to the arrow 15 generated by computer 1 (e.g., in a different direction, such as perpendicular to arrow 15). Responsive to receiving the driver's input (e.g., via arrow 16), computer 1 may update its information and its planned route accordingly. In particular, responsive to receiving the input from the user indicative of the expected escape direction for the animals (e.g., arrow 16), the at least one processor may be configured to modify the automatically suggested driving route to a different route.

Thus, FIG. 1 depicts multiple computers (computer 1 and on-board computer 5) as performing the respective steps of automatically determining the planning route and automatically performing a subsequent operation (e.g., one or both of automatically displaying the planned route on the display 14 and/or automatically and autonomously controlling the route of the agricultural work machine 4). Alternatively, a single computer may perform both the automatic determining the planning route and automatic performing a subsequent operation. In this regard, at least one computer may be used to perform both the automatic determining the planning route and automatic performing a subsequent operation.

Figure 3A:
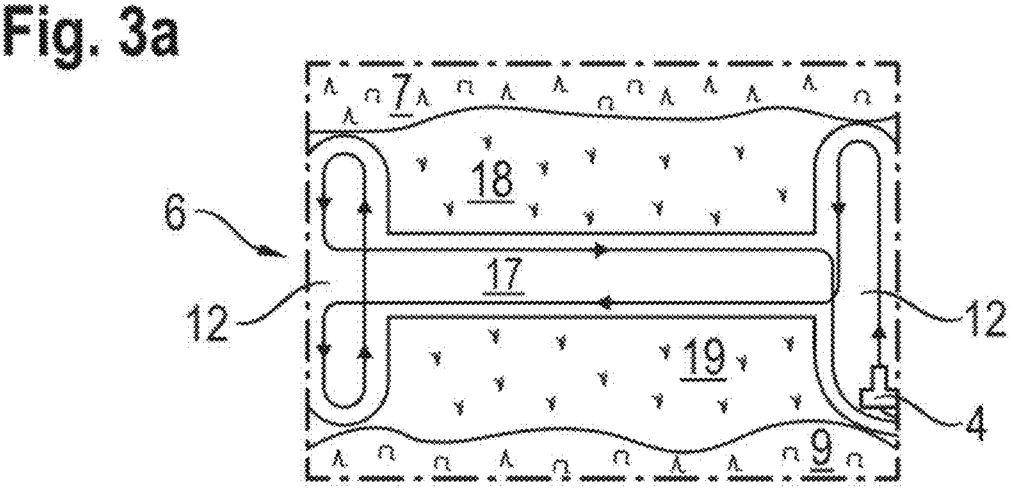
FIGS. 3*a-b* illustrate a second exemplary situation of use of the assistance system.
Figure 3B:
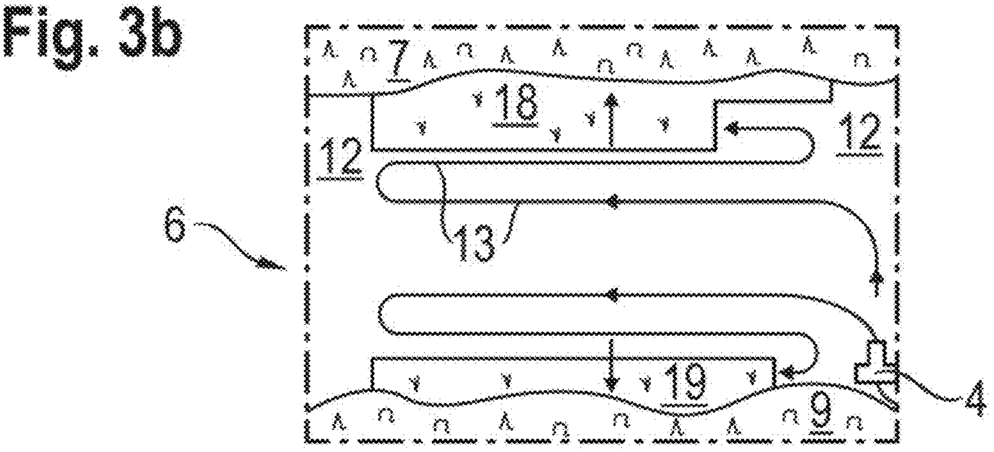

FIGS. 3*a-b* illustrate a second example of route planning. In particular, FIGS. 3*a-b* illustrate different subsections of agricultural area 6, including edge strip 12, central strip 17, and sections 18, 19. Here, the area to be worked is bordered on two sides by wooded parcels 7, 9 suitable as a refuge, but there is no road via which an entry to the area at various points is possible. The route plan therefore may initially envisage clearing an edge strip 12 on one side of the agricultural area 6, extending from one wooded area to the other, then driving once across the middle of the area to create a clear central strip 17, and creating another edge strip 12 on the opposite side of agricultural area 6. In this way, two unworked sections 18, 19 may be obtained, each of which has a connection to a wooded area into which the animals may retreat, or into which they are gradually displaced as the agricultural work machine 4 gradually advances from the central strip 17 to the wooded parcels 7, 9 as shown in FIG. 3*b*. In this regard, computer 1 may consider one or both of the presence of road(s) or the absence of road(s) in combination with safe area(s) for the animals (e.g., wooded parcels 7, 9) in generating the route plan. For example, the route plan may work different sections of the agricultural area 6, such as one or both of edge strip(s) 12 or central strip(s) 17. Further, computer 1 may select a sequence of sections to work, such as selecting the route plan to first work the central strip(s) 17 and/or edge strip(s) 12, and then some or all of the remaining sections of the agricultural area 6 such as unworked sections 18, 19 to effectively guide the animals to the safe wooded parcels 7, 9, respectively.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Computer
2 Database
3 Database
4 Agricultural work machine
5 Onboard computer
6 Agricultural area
7 Wooded area
8 Road
9 Wooded area
10 Field
11 Field
12 Edge strip
13 Track
14 Display
15 Arrow
16 Arrow
17 Central strip
18 Section
19 Section
20 Processor
21 Memory

The invention claimed is:

1. A system configured to generate a driving route for one or more agricultural work machines and to automatically perform at least one operation with the driving route, the system comprising:
- at least one memory configured to store; one or more strategies; and environmental data, regarding an agricultural area to be worked by the one or more agricultural work machines; and
- at least one processor in communication with the at least one memory configured to:
  - generate the driving route for the one or more agricultural work machines for working the agricultural area based on a strategy selected from the one or more strategies and based on the environmental data regarding the agricultural area so that the driving route guides one or more animals away from the agricultural area by:
    - analyzing, based on at least one of presence of vegetation or type of vegetation, one or more land parcels that are adjacent to the agricultural area and that are not to be worked;
    - selecting, based on the analysis, at least one land parcel, of the one or more land parcels, to serve as an escape destination for the one or more animals staying on the agricultural area; and generating, based on the at least one land parcel, the driving route in order to perform the at least one operation on the agricultural area and to avoid contact the one or more animals in the agricultural area; and automatically perform one or more of:

automatically transmit, to the one or more agricultural work machines, the driving route, thereby causing at least partly automatically control of the one or more agricultural work machines according to the driving route;

automatically generate an output image by superimposing the driving route onto an image or a map view of the agricultural area; or automatically control, based on the driving route, the one or more agricultural work machines.

2. The system of claim 1, wherein the one or more land parcels cannot be traversed by the one or more agricultural work machines at least while the one or more agricultural work machines are working.

3. The system of claim 1, wherein the at least one processor is further configured to: query the environmental data from one or both of a user or a database.

4. The system of claim 1, wherein the at least one processor is further configured to select the strategy from the one or more strategies based on each of a season of year, an animal species to be protected, and a size of the agricultural area to be worked.

5. The system of claim 1, wherein the at least one processor is configured to generate the driving route by:

determining the at least one land parcel that is adjacent to the agricultural area to be worked as a safe area for the animals to move to from the agricultural area;

selecting at least one subsection of the agricultural area that is adjacent to the at least one land parcel; and determining the driving route by working the at least one subsection of the agricultural area that is adjacent to the at least one land parcel before at least one other subsection of the agricultural area.

6. The system of claim 5, wherein the at least one subsection of the agricultural area that is adjacent to the at least one land parcel comprises a strip; and wherein the at least one other subsection of the agricultural area is perpendicular to the strip.

7. The system of claim 5, wherein the at least one processor is configured to generate the driving route so that a subsection that is further away from the at least one land parcel that is the safe area is worked prior to at least one subsection that is adjacent to the at least one land parcel.

8. The system of claim 7, wherein the subsection that is further away from the at least one land parcel comprises a central part of the agricultural area to be worked.

9. The system of claim 8, wherein the at least one processor is configured to generate the driving route by:

selecting the driving route such that the central part and one or more edge parts flanking the central part are worked prior to the at least one subsection that is adjacent to the at least one land parcel.

10. The system of claim 9, wherein the at least one processor is configured to select the driving route such that the central part of the agricultural area is worked later than the one or more edge parts.

11. The system of claim 9, wherein the at least one processor is configured to select the driving route such that the central part of the agricultural area is worked earlier than at least two parts adjoining the central part on either side of the central part.

12. The system of claim 1, wherein the at least one processor is configured to select the driving route to run predominantly parallel to an edge of the agricultural area adjacent to which is a parcel suitable as a cover or way of escape for the animals.

13. The system of claim 1, further comprising a user interface; and wherein the at least one processor is further configured to:

display on the user interface the output image including a direction, superimposed on the map view or the image of the agricultural area, of an escape route for the one or more animals staying on the agricultural area;

receive input via the user interface from a user indicative of a different escape direction for the one or more animals staying on the agricultural area that is different from the direction of the escape route in the output image;

revise, using the different escape direction, the driving route based on the input from the user; and display the revised driving route on the user interface.

14. The system of claim 1, wherein the at least one processor is configured to analyze the one or more land parcels that are adjacent to the agricultural area and that are not to be worked based on each of: the at least one of presence of vegetation or the type of vegetation; and one or more strategies of species of the one or more animals.

15. The system of claim 1, wherein the at least one processor is configured to analyze the one or more land parcels that are adjacent to the agricultural area and that are not to be worked based on each of: the at least one of presence of vegetation or the type of vegetation; and one or more behavioral differences of species of the one or more animals.

16. The system of claim 15, wherein the one or more behavioral differences comprise mating and rearing.

17. The system of claim 1, wherein, responsive to selecting the at least one land parcel to serve as the escape destination for the one or more animals, the at least one processor is configured to generate the driving route within the agricultural area in order to push the one or more animals to the at least one land parcel.

18. The system of claim 17, wherein the at least one processor is configured to generate the driving route to snake in order to push the one or more animals within the agricultural area to the at least one land parcel.

19. The system of claim 17, wherein the at least one processor is configured to analyze the one or more land parcels that are adjacent to the agricultural area and that are not to be worked by determining whether a respective parcel is a wooded parcel or is a field with less cover than the wooded parcel; and wherein the at least one processor is configured to select the respective parcel based on whether the respective parcel is the wooded parcel or the field.

20. The system of claim 19, wherein the at least one processor is configured to generate the driving route based on the respective parcel that is selected based on the driving route being a sufficient time for the one or more animals to travel to the respective parcel.

* * * * *